United States Patent
Patten, Jr. et al.

(10) Patent No.: US 8,112,434 B2
(45) Date of Patent: Feb. 7, 2012

(54) PERFORMANCE OF AN ENTERPRISE SERVICE BUS BY DECOMPOSING A QUERY RESULT FROM THE SERVICE REGISTRY

(75) Inventors: Willie Robert Patten, Jr., Hurdle Mills, NC (US); Eoin Lane, Littleton, MA (US); Subhash Kumar, Piscataway, NJ (US)

(73) Assignee: International Business Machines Corporation, Armonk, NY (US)

( * ) Notice: Subject to any disclaimer, the term of this patent is extended or adjusted under 35 U.S.C. 154(b) by 519 days.

(21) Appl. No.: 11/774,659

(22) Filed: Jul. 9, 2007

(65) Prior Publication Data

US 2009/0018998 A1  Jan. 15, 2009

(51) Int. Cl.
 *G06F 17/30* (2006.01)
(52) U.S. Cl. ......... 707/769; 707/613; 707/770; 707/781
(58) Field of Classification Search .................. 707/613, 707/769, 770, 781
See application file for complete search history.

(56) References Cited

U.S. PATENT DOCUMENTS

| | | | |
|---|---|---|---|
| 6,516,349 B1 * | 2/2003 | Lieberman | 709/225 |
| 6,857,123 B1 * | 2/2005 | Nuxoll et al. | 719/316 |
| 7,571,208 B2 * | 8/2009 | Syed et al. | 709/203 |
| 7,890,540 B2 * | 2/2011 | Shaburov | 707/802 |
| 2002/0052948 A1 * | 5/2002 | Baudu et al. | 709/224 |
| 2002/0174262 A1 * | 11/2002 | Marcos et al. | 709/315 |
| 2003/0069980 A1 * | 4/2003 | Picca et al. | 709/227 |
| 2003/0208478 A1 * | 11/2003 | Harvey | 707/3 |
| 2004/0028212 A1 * | 2/2004 | Lok et al. | 379/265.09 |
| 2004/0236780 A1 * | 11/2004 | Blevins et al. | 707/102 |
| 2005/0033588 A1 | 2/2005 | Ruiz et al. | 705/1 |
| 2005/0234969 A1 * | 10/2005 | Mamou et al. | 707/102 |
| 2005/0278410 A1 * | 12/2005 | Espino | 709/201 |
| 2006/0212593 A1 * | 9/2006 | Patrick et al. | 709/230 |
| 2006/0235976 A1 * | 10/2006 | Chen et al. | 709/227 |
| 2006/0248176 A1 * | 11/2006 | McDowall et al. | 709/223 |
| 2007/0005387 A1 | 1/2007 | Deane et al. | 705/1 |
| 2007/0011126 A1 * | 1/2007 | Conner et al. | 706/47 |

(Continued)

FOREIGN PATENT DOCUMENTS

WO  W02004055693 A1  7/2004

OTHER PUBLICATIONS

Parsing, Wikipedia, Jan. 3, 2007.*

(Continued)

*Primary Examiner* — Frantz Coby
(74) *Attorney, Agent, or Firm* — Robert A. Voigt, Jr.; Winstead, P.C.

(57) ABSTRACT

A method, system and computer program product for improving performance of an enterprise service bus. A cache is used to store collections of service objects where each service object includes service meta-data associated with a web service application. The cache may be accessed by the enterprise service bus to service "generic queries" from the client instead of accessing the service registry. Further, the collections of service objects are decomposed into instances of the collections of service objects. These instances of the collections of service objects are stored in the cache which is used by the enterprise service bus to service "direct queries" from the client instead of accessing the service registry. By reducing the number of accesses to the service registry, the network traffic is lessened and the performance of the enterprise service bus is improved.

20 Claims, 7 Drawing Sheets

U.S. PATENT DOCUMENTS

| | | | |
|---|---|---|---|
| 2007/0019641 A1* | 1/2007 | Pai et al. | 370/389 |
| 2007/0027822 A1* | 2/2007 | Johnson et al. | 705/400 |
| 2007/0050705 A1* | 3/2007 | Liu et al. | 715/513 |
| 2007/0089117 A1 | 4/2007 | Samson | 719/330 |
| 2007/0101272 A1 | 5/2007 | Nomura et al. | 715/734 |
| 2007/0106629 A1 | 5/2007 | Endacott et al. | 706/47 |
| 2007/0112947 A1 | 5/2007 | Anderson et al. | 709/223 |
| 2007/0124475 A1* | 5/2007 | Syed et al. | 709/226 |
| 2008/0120380 A1* | 5/2008 | Boyd et al. | 709/206 |
| 2008/0168150 A1* | 7/2008 | Chen et al. | 709/206 |
| 2008/0250097 A1* | 10/2008 | Angelini et al. | 709/202 |
| 2008/0271047 A1* | 10/2008 | Rafnsson | 719/311 |
| 2009/0024561 A1* | 1/2009 | Palanisamy | 707/1 |
| 2009/0028132 A1* | 1/2009 | Portman et al. | 370/352 |
| 2010/0218229 A1* | 8/2010 | Lee et al. | 725/112 |

OTHER PUBLICATIONS

Frounchi, K. et al. "A QoS-Aware Web Service Replica Selection Framework for an Extranet", Canadian Conference on Electrical and Computer Engineering, XP031004993. May 1, 2006.

Goodman, B. "Accelerate your Web Services with Caching", Internet Citation XP-002274611, Dec. 1, 2002.

* cited by examiner

| KEYS | VALVE |
|---|---|
| QUERY STRING | COLLECTION OF SERVICE OBJECTS, SERVICE OBJECTS 1, 2, & 3 |
| UNIQUE NAME 1 | SERVICE OBJECT 1 |
| UNIQUE NAME 2 | SERVICE OBJECT 2 |
| UNIQUE NAME 3 | SERVICE OBJECT 3 |

FIG. 5

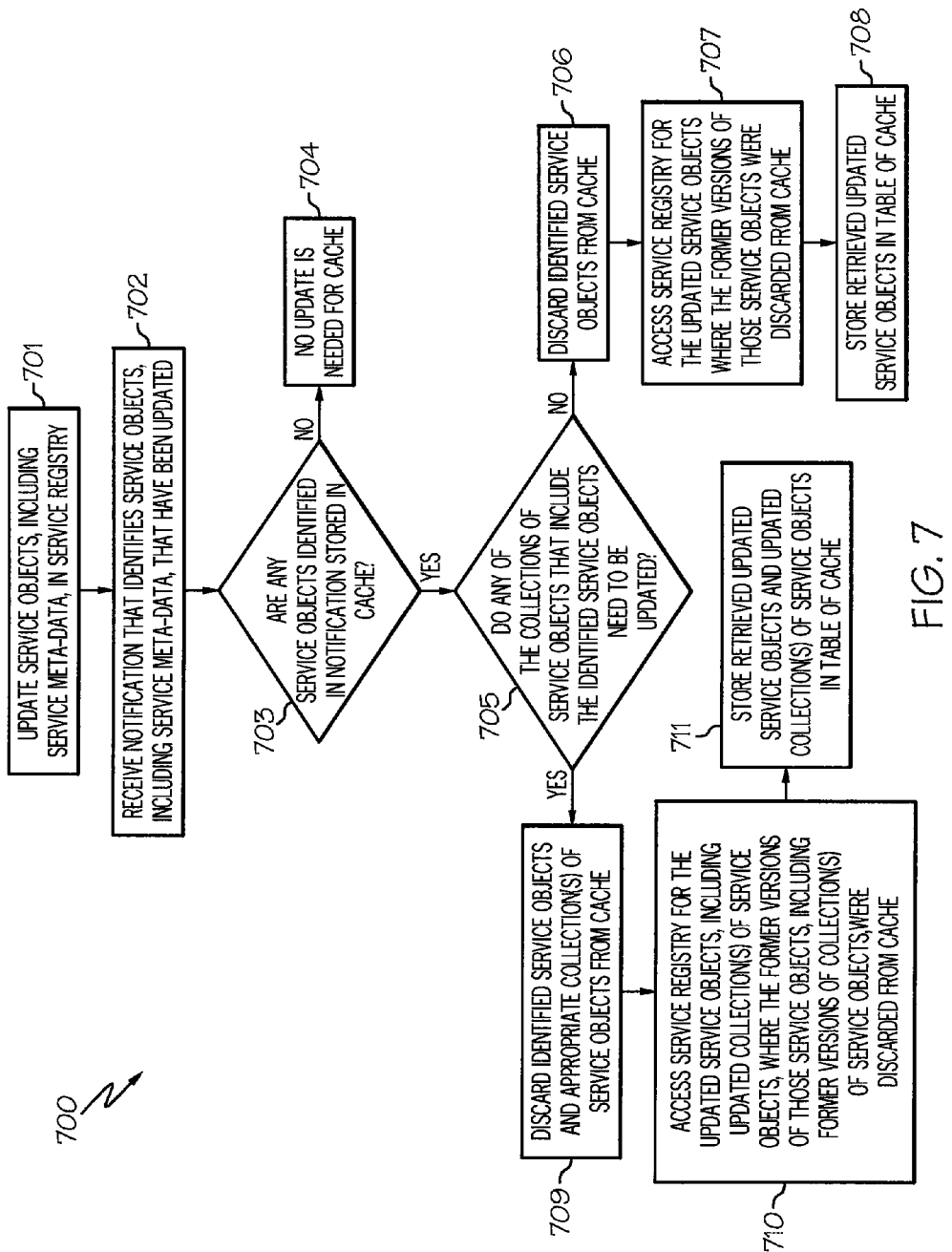

PERFORMANCE OF AN ENTERPRISE SERVICE BUS BY DECOMPOSING A QUERY RESULT FROM THE SERVICE REGISTRY

TECHNICAL FIELD

The present invention relates to the field of web services, and more particularly to improving the performance of an enterprise service bus by decomposing a query result from the service registry.

BACKGROUND INFORMATION

The World Wide Web Consortium (W3C), which is the main international standards organization for the World Wide Web, has defined a "web service" as a software system designed to support interoperable machine to machine interaction over a network. That is, web services may refer to web-based applications that interact with other web-based applications in order to provide a desired service. For example, application software on a user's desktop computer (e.g., Microsoft™ Money) may send messages via the Internet to a stock quote server in order to retrieve current stock quotes for selected stocks. The application software may then display the retrieved information within the application for the user. Other examples of common web services include banking, currency converters, airplane flight schedule lookups, auction services and language translation services.

As discussed above, a web service may refer to software system designed to support interoperable machine to machine interaction over a network. One machine may be referred to as the "client." The client refers to the machine that requests a service. The request from the client may be received by what is referred to as an "enterprise service bus" which acts as an intermediary between the client and a machine, referred to as the "provider," which provides the requested service. The enterprise service bus may also be referred to as a "message broker" where the message broker is an intermediary program that transforms the message from the client to the provider thereby allowing the provider and the client to send data back and forth to each other. For example, the client's service request may be transformed from the Simple Object Access Protocol (SOAP)-standard over HyperText Transfer Protocol (HTTP) format to the SOAP over Java Messaging Service (JMS) format in order for the provider to service the client's request if the formal messaging protocol of the provider is JMS instead of HTTP.

In addition to transforming the client's message, the enterprise service bus may further determine which "provider" services the client's request. This specific provider may be referred to as an "endpoint." That is, the enterprise service bus identifies the endpoint, which is the machine that provides the services requested by the client. The enterprise service bus may identify the endpoint by obtaining what is referred to as "service meta-data." Service meta-data may refer to data that identifies the endpoint as well as how to invoke that endpoint. The service meta-data may be stored in a database referred to herein as the "service registry."

For each service request it receives from the client, the enterprise service bus accesses the service registry to obtain the appropriate service meta-data in order to determine which endpoint to service the client's request as well as how to invoke that endpoint. By having to access the service registry to determine which endpoint to service the client's request for every client request, network traffic is greatly increased and may cause the enterprise service bus to be unable to meet the system's quality of service requirements. If, however, the enterprise service bus did not have to access the service registry each time it received a service request form the client, then the network traffic would be lessened and the performance of the enterprise service bus would be improved.

Therefore, there is a need in the art to improve the performance of the enterprise service bus by reducing the number of accesses to the service registry in connection with servicing a client's request.

SUMMARY

The problems outlined above may at least in part be solved in some embodiments by having a cache to store collections of service objects where each service object includes service meta-data associated with a web service application. The cache may be accessed by the enterprise service bus to service "generic queries" from the client instead of accessing the service registry. Generic queries may refer to queries that do not specify particular service applications. Further, the collections of service objects are decomposed into instances of the collections of service objects. These instances of the collections of service objects may then be stored in the cache which is used by the enterprise service bus to service "direct queries" from the client instead of accessing the service registry. Direct queries may refer to queries that specify particular service applications. By reducing the number of accesses to the service registry, the network traffic is lessened and the performance of the enterprise service bus is improved.

In one embodiment of the present invention, a method for improving performance of an enterprise service bus comprises the step of receiving a query from a client. The method further comprises accessing a service registry to obtain a collection of service objects in response to the query. The method further comprises decomposing the collection of service objects into instances of the collection of service objects. The method additionally comprises storing the collection of service objects as well as the instances of the collection of service objects in the cache.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which:

FIG. 5 is a diagram of the cache used to illustrate populating the cache with both a collection of service objects as well as instances from the collection of service objects in accordance with an embodiment of the present invention;

FIG. 7 is a flowchart of a method for maintaining synchronization between the cache and the service registry in accordance with an embodiment of the present invention.

DETAILED DESCRIPTION

The present invention comprises a method, system and computer program product for improving performance of an enterprise service bus. In one embodiment of the present invention, a cache may be used to store collections of service objects where each service object includes service meta-data associated with a web service application. The cache may be accessed by the enterprise service bus to service "generic queries" from the client instead of accessing the service registry. Generic queries may refer to queries that do not specify particular service applications. Further, the collections of service objects are decomposed into instances of the collections of service objects. These instances of the collections of service objects may be stored in the cache which is used by the enterprise service bus to service "direct queries" from the client instead of accessing the service registry. Direct queries may refer to queries that specify particular service applications. By reducing the number of accesses to the service registry, the network traffic is lessened and the performance of the enterprise service bus is improved.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
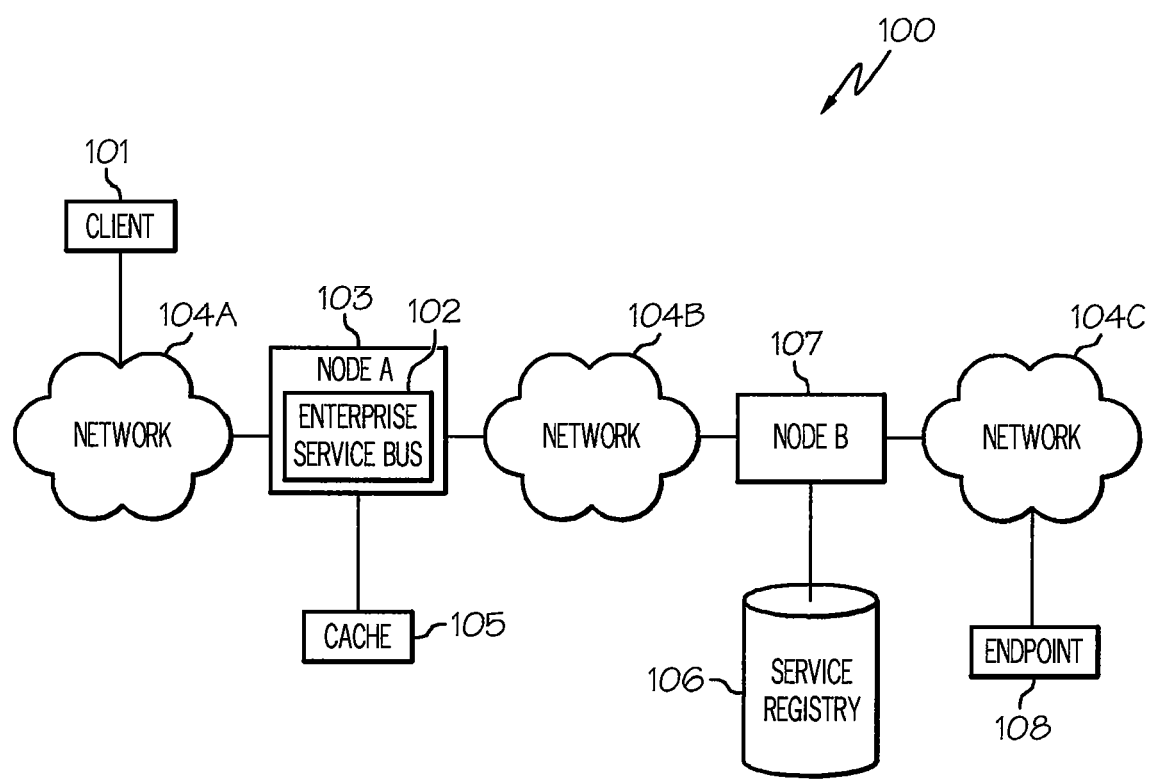
FIG. 1 illustrates a network system in accordance with an embodiment of the present invention.

FIG. 1—Network System for Web Services

FIG. 1 illustrates an embodiment of a network system 100 for implementing web services in accordance with the present invention. Network system 100 may include a client 101 that requests a service (e.g., retrieve current stock quotes for selected stocks) to be performed. A more detail description of client 101 is provided further below in connection with FIG. 2. The service request may be received by an enterprise service bus 102 within a node (designated as node "A") 103 via a network 104A. Network system 100 may further include a cache 105 coupled to node A 103 where cache 105 may be used to improve the performance of enterprise service bus 102 as discussed further below.

Upon receipt of the client's service request, enterprise service bus 102 may access a service registry 106 coupled to a node (designated as node "B") 107 via network 104B. Service registry 106 may refer to a database that stores "service meta-data" where "service meta-data" may refer to data that identifies the specific provider or "endpoint" necessary to service client's 101 request. The service meta-data may further include data that informs enterprise service bus 102 as to how to invoke that endpoint. For instance, enterprise service bus 102 upon receipt of the service meta-data acquired from service registry 106 may identify endpoint 108 to service client's 101. Endpoint 108 may be coupled to node B 107 via network 104C. A more detail description of nodes 103, 107 and endpoint 108 is provided further below in connection with FIG. 3.

Networks 104A-C may collectively or individually be referred to as networks 104 or network 104, respectively. Networks 104 may refer to a Local Area Network (LAN) (e.g., Ethernet, Token Ring, ARCnet), or a Wide Area Network (WAN) (e.g., Internet). Network system 100 may include any number of networks 104 and the location of client 101, node A 103, node B 107 and endpoint 108 may be distributed among network system 100 in any manner. Network system 100 depicted in FIG. 1 is illustrative and is not to be limited in scope to any one particular embodiment. For example, the inter-connection between the elements of network system 100 (e.g., client 101, node A 103, node B 107, endpoint 108) is illustrative and is not to be limited to such an inter-connection.

As discussed in the Background Information section, for each service request the enterprise service bus receives from the client, the enterprise service bus accesses the service registry to obtain the appropriate service meta-data in order to determine which endpoint to service the client's request as well as how to invoke that endpoint. By having to access the service registry to determine which endpoint to service the client's request for every client request, network traffic is greatly increased and may cause the enterprise service bus to be unable to meet the system's quality of service requirements. If, however, the enterprise service bus did not have to access the service registry each time it received a service request from the client, then the network traffic would be lessened and the performance of the enterprise service bus would be improved. Therefore, there is a need in the art to improve the performance of the enterprise service bus by reducing the number of accesses to the service registry in connection with servicing a client's request. The number of accesses to service registry 106 by enterprise service bus 102 may be reduced by including cache 105 where cache 105 may store service meta-data that has been recently accessed from service registry 106. By storing recently accessed service meta-data in cache 105, enterprise service bus 102 may access cache 105 instead of service registry 106 thereby reducing network traffic and improving performance.

However, the service meta-data stored in cache 105 may be stored as a collection or a set of service meta-data. For example, cache 105 may store a collection of financial service applications that may be accessed by a "generic query" for financial services. For instance, client 101 may request to obtain a list of financial service applications. A query of this nature is referred to as a "generic query" where a particular instance of a financial service application is not requested. Enterprise service bus 102, in response to such a generic query, may look-up in its cache 105 to see if there is a collection of service meta-data for financial services. If cache 105 contains a collection of service meta-data for financial services, then enterprise service bus 102 may service client's 101 request by returning the list of financial service applications.

However, cache 105 may not have stored the individual instances for a collection of service meta-data. For example, cache 105 may not have stored the individual instances of financial service applications that were retrieved and stored as a collection of financial services. Hence, enterprise service bus 102 would not be able to service a request, referred to herein as a "direct request," without the need to access service registry 106. A direct request is a request that requests a particular instance of a web service application to service client's 101 request. For example, suppose client 101 requests to obtain data (e.g., current stock quotes for selected stocks) from a particular financial service application. If cache 105 stored the service meta-data as a collection for financial service applications, then enterprise service bus 102 will not be able to locate the service meta-data for the requested financial service application even though it may be stored under the collection of financial services since the service meta-data is classified as a "collection" of financial services. Enterprise service bus 102 will then have to access service registry 106 to obtain the service meta-data for the requested web service application thereby increasing network traffic and reducing performance.

Figure 4:
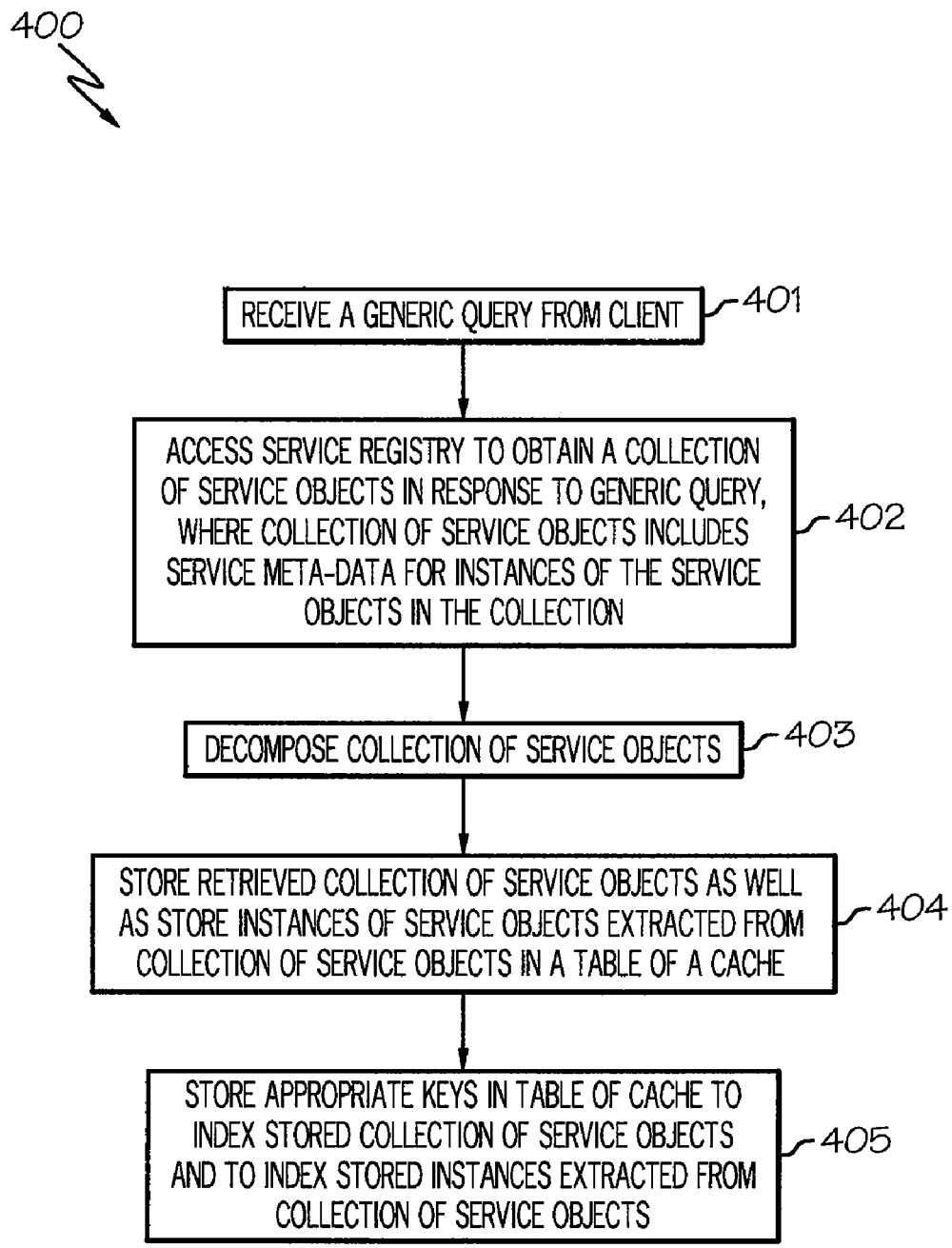
FIG. 4 is a flowchart of a method for populating a cache with decomposed query results in accordance with an embodiment of the present invention.
Figure 6:
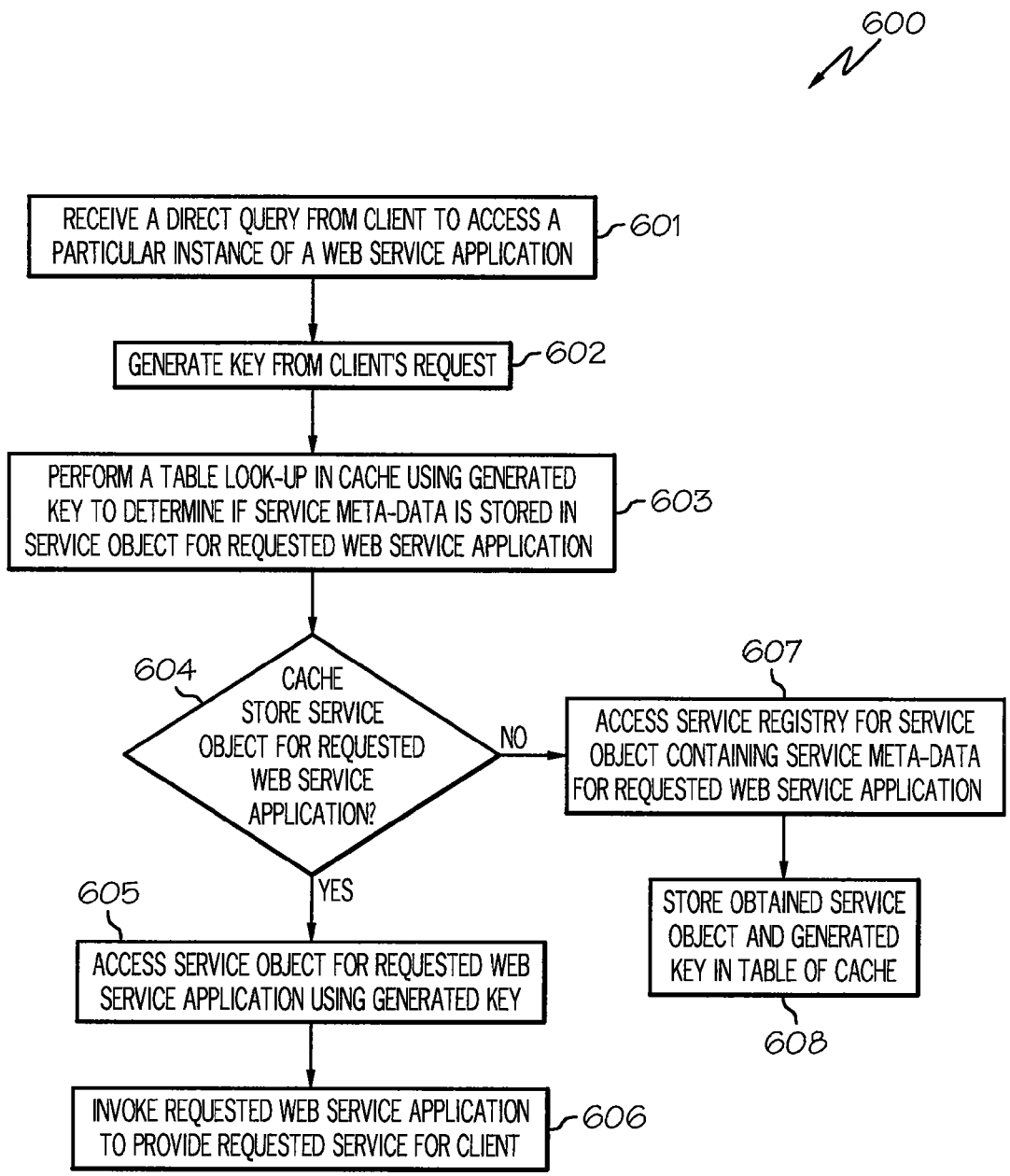
FIG. 6 is a flowchart of a method for handling cache hits and misses in accordance with an embodiment of the present invention.

If, however, enterprise service bus 102 could access individual instances of service meta-data stored as a collection in cache 105, then enterprise service bus 102 may not have to access service registry 106 as often thereby reducing network traffic and improving performance. That is, if enterprise service bus 102 could access individual instances of service meta-data, which may have been initially stored as a collection in cache 105, then the hit rate of cache 105 may be improved thereby reducing network traffic and improving performance. Enterprise service bus 102 may access individual instances of service meta-data stored as a collection in cache 105 when servicing client's 101 request as discussed further below in connection with FIGS. 4-7. FIG. 4 is a flowchart of populating cache 105 with decomposing the query result from service registry 106. FIG. 5 is a diagram of a table of cache 105 used for storing service objects and keys used to index those stored service objects. FIG. 6 is a flowchart of handling cache hits and cache misses. FIG. 7 is a flowchart of maintaining synchronization between cache 105 and service registry 106 to ensure data consistency between cache 105 and service registry 106.

As stated above, a detail description of client 101 is provided below in connection with FIG. 2. Further, a detail description of nodes 103, 107 and endpoint 108 is provided below in connection with FIG. 3.

Figure 2:
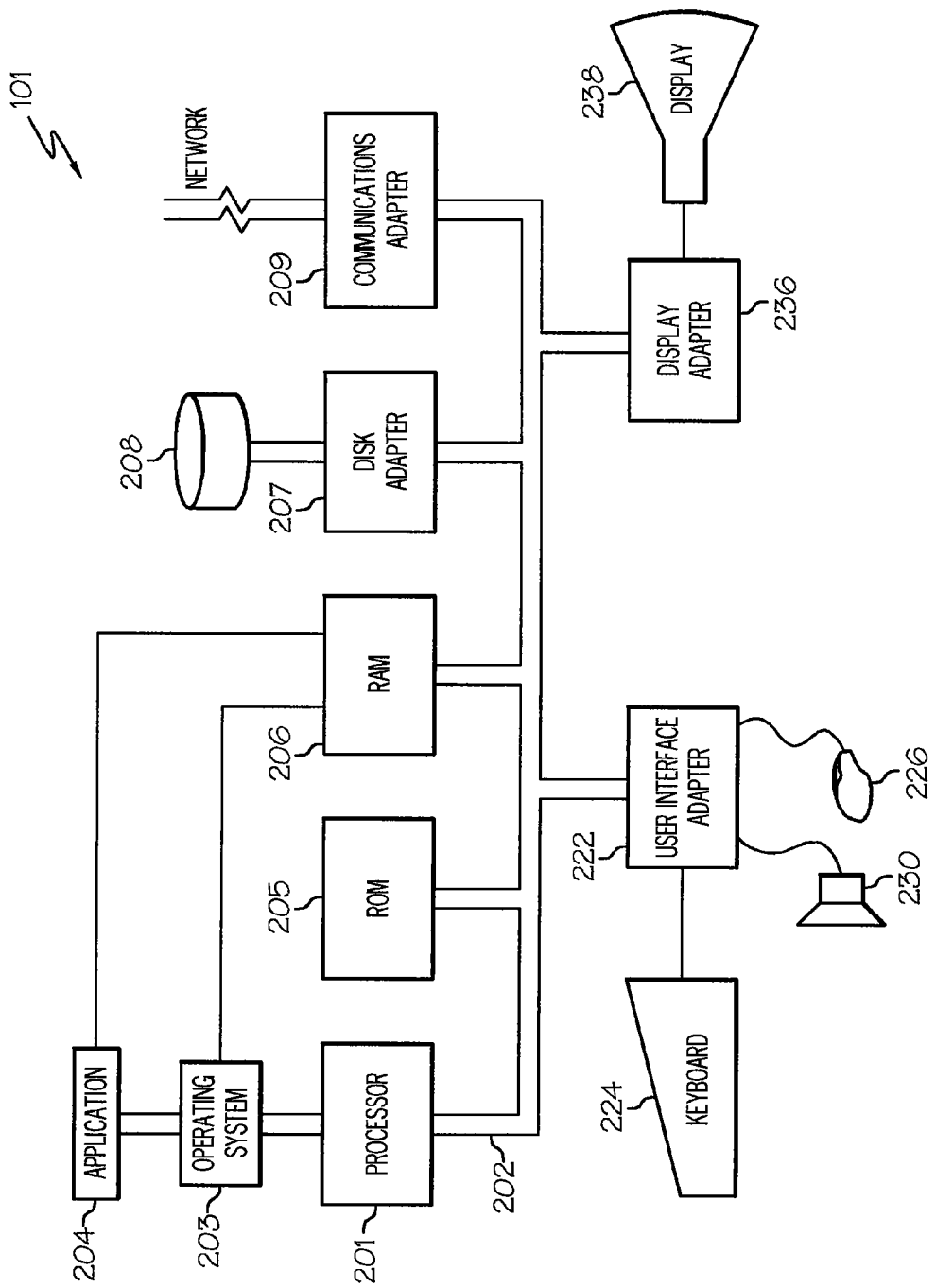
FIG. 2 illustrates a hardware configuration of a client in accordance with an embodiment of the present invention.

FIG. 2—Hardware Configuration of Client

FIG. 2 illustrates an embodiment of a hardware configuration of client 101 (FIG. 1) which is representative of a hardware environment for practicing the present invention. Client 101 may have a processor 201 coupled to various other components by system bus 202. An operating system 203 may run on processor 201 and provide control and coordinate the functions of the various components of FIG. 2. An application 204 in accordance with the principles of the present invention may run in conjunction with operating system 203 and provide calls to operating system 203 where the calls implement the various functions or services to be performed by application 204. Application 204 may include, for example, a web browser, a program for issuing service requests.

Referring to FIG. 2, Read-Only Memory (ROM) 205 may be coupled to system bus 202 and include a basic input/output system ("BIOS") that controls certain basic functions of client 101. Random access memory (RAM) 206 and disk adapter 207 may also be coupled to system bus 202. It should be noted that software components including operating system 203 and application 204 may be loaded into RAM 206, which may be client's 101 main memory for execution. Disk adapter 207 may be an integrated drive electronics ("IDE") adapter that communicates with a disk unit 208, e.g., disk drive. It is noted that the program for issuing service requests may reside in disk unit 208 or in application 204.

Referring to FIG. 2, client 101 may further include a communications adapter 209 coupled to bus 202. Communications adapter 209 may interconnect bus 202 with an outside network (e.g., network 104A of FIG. 1) enabling client 101 to communicate with endpoint 108 (FIG. 1) via enterprise service bus 102 (FIG. 1).

I/O devices may also be connected to client 101 via a user interface adapter 222 and a display adapter 236. Keyboard 224, mouse 226 and speaker 230 may all be interconnected to bus 202 through user interface adapter 222. Data may be inputted to client 101 through any of these devices. A display monitor 238 may be connected to system bus 202 by display adapter 236. In this manner, a user is capable of inputting to client 101 through keyboard 224 or mouse 226 and receiving output from client 101 via display 238 or speaker 230.

Figure 3:
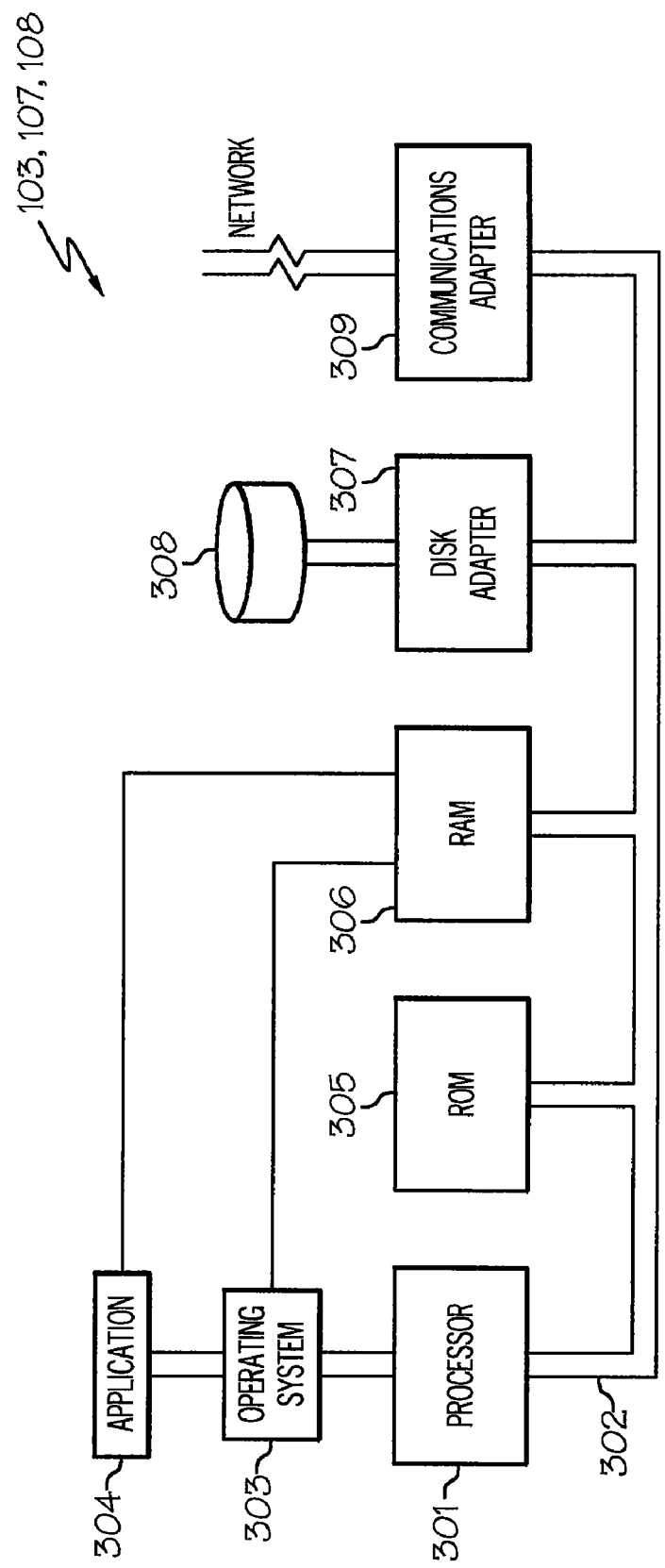
FIG. 3 illustrates a hardware configuration of nodes and an endpoint in accordance with an embodiment of the present invention.

FIG. 3—Hardware Configuration of Nodes and Endpoint

FIG. 3 illustrates a typical hardware configuration of a nodes 103, 107 (FIG. 1) and endpoint 108 (FIG. 1) which is representative of a hardware environment for practicing the present invention. Nodes 103, 107 and endpoint 108 may have a processor 301 coupled to various other components by system bus 302. An operating system 303 may run on processor 301 and provide control and coordinate the functions of the various components of FIG. 3. An application 304 in accordance with the principles of the present invention may run in conjunction with operating system 303 and provide calls to operating system 303 where the calls implement the various functions or services to be performed by application 304. Application 304 of node 103 may include, for example, enterprise service bus 102, a program for populating cache 105 (FIG. 1) with decomposing the query result from service registry 106 (FIG. 1) as discussed below in association with FIG. 4. Application 304 of node 103 may further include, for example, a program for handling cache hits and cache misses for cache 105 as discussed below in association with FIG. 6. Application 304 of node 103 may additionally include, for example, a program for maintaining synchronization between cache 105 and service registry 106 to ensure data consistency between cache 105 and service registry 106 as discussed below in association with FIG. 7. Application 304 of node 107 may include, for example, a program for updating the service objects, including the service meta-data, in service registry 106 as discussed below in association with FIG. 7. Application of endpoint 108 may include, for example, a program for servicing client's 101 (FIG. 1) request.

Referring to FIG. 3, Read-Only Memory (ROM) 305 may be coupled to system bus 302 and include a basic input/output system ("BIOS") that controls certain basic functions of nodes 103, 107 and endpoint 108. Random access memory (RAM) 306 and disk adapter 307 may also be coupled to system bus 302. It should be noted that software components including operating system 303 and application 304 may be loaded into RAM 306, which may be nodes' 103, 107 and endpoint's 108 main memory for execution. Disk adapter 307 may be an integrated drive electronics ("IDE") adapter that communicates with a disk unit 308, e.g., disk drive. It is noted that the program for populating cache 105 with decomposing the query result from service registry 106, as discussed below in association with FIG. 4, may reside in disk unit 308 or in application 304. It is further noted that the program for handling cache hits and cache misses for cache 105, as discussed below in association with FIG. 6, may reside in disk unit 308 or in application 304. It is additionally noted that the program for maintaining synchronization between cache 105 and service registry 106 to ensure data consistency between cache 105 and service registry 106, as discussed below in association with FIG. 7, may reside in disk unit 308 or in application 304. It is further noted that the program for updating the service objects, including the service meta-data, in service registry 106, as discussed below in association with FIG. 7, may reside in disk unit 308 or in application 304. It is further noted that the program for servicing client's 101 request may reside in disk unit 308 or in application 304.

Referring to FIG. 3, nodes 103, 107 and endpoint 108 may further include a communications adapter 309 coupled to bus 302. Communications adapter 309 may interconnect bus 302 with a network (e.g., network 104A, 104B, 104C) enabling nodes 103, 107 and endpoint 108 to communicate with other devices as illustrated in FIG. 1.

The various aspects, features, embodiments or implementations of the invention described herein can be used alone or in various combinations. The methods of the present invention can be implemented by software, hardware or a combination of hardware and software. The present invention can also be embodied as computer readable code on a computer readable medium. The computer readable medium is any data storage device that can store data which can thereafter be read by a computer system. Examples of the computer readable medium include read-only memory, random access memory, CD-ROMs, flash memory cards, DVDs, magnetic tape, optical data storage devices, and carrier waves. The computer readable medium can also be distributed over network-coupled computer systems so that the computer readable code is stored and executed in a distributed fashion.

As discussed above, referring to FIG. 1, the service meta-data stored in cache 105 may be stored as a collection or a set of service meta-data. For example, cache 105 may store a collection of financial service applications that may be accessed by a "generic query" for financial services. For instance, client 101 may request to obtain a list of financial service applications. A query of this nature is referred to as a "generic query" where a particular instance of a financial service application is not requested. However, cache 105 may not have stored the individual instances for a collection of service meta-data. For example, cache 105 may not have stored the instances of financial service applications that are stored as a collection of financial services. Hence, enterprise service bus 102 would not be able to service a request, referred to herein as a "direct request." A direct request is a request that requests a particular instance of a web service application to service client's 101 request. For example, suppose client 101 requests to obtain data (e.g., current stock quotes for selected stocks) from a particular financial service application. If cache 105 stored the service meta-data as a collection for financial service applications, then enterprise service bus 102 will not be able to locate the service meta-data for the requested financial service application even though it may be stored under the collection of financial services since the service meta-data is classified as a "collection" of financial services. Enterprise service bus 102 will then have to access service registry 106 to obtain the service meta-data for the requested web service application thereby increasing network traffic and reducing performance. If, however, enterprise service bus 102 could access individual instances of service meta-data stored as a collection in cache 105, then enterprise service bus 102 may not have to access service registry 106 as often thereby reducing network traffic and improving performance.

In one embodiment, enterprise service bus 102 may access instances of service meta-data stored as a collection in cache 105 by decomposing a query result from service registry 106 as discussed below in connection with FIGS. 4-5. Decomposing a query result may refer to extracting the instances from a collection of "service objects" where each service object includes service meta-data associated with a service application. In object-oriented programming language, a class is a collection of data and methods that operate on that data. The data and methods taken together describe the state and behavior of what is commonly referred to as an object. An "object," as used herein, in essence includes data and code where the code manipulates the data. Hence, "service objects," as used herein include data, such as service meta-data, and code where the code manipulates the data.

As discussed above, decomposing a query result may refer to extracting the instances from a collection of "service objects" where each service object includes service meta-data associated with a service application. For instance, service registry 106 may store a collection of service objects associated with financial service applications. The collection of service objects may be classified as a "collection of financial services" where each service object in the collection may include service meta-data associated with financial service applications. The collection of service objects may be associated with a generic query (e.g., provide a listing of financial service applications) and hence may be retrieved from service registry 106 in response to a generic query from client 101. Upon retrieving the collection of service objects, the collection may be decomposed into instances of the collection of service objects. For example, the collection of service objects classified for financial services may be decomposed into particular service objects, where each particular service object includes service meta-data associated with a particular financial service application. In this manner, enterprise service bus 104 will now able to access individual instances of service meta-data stored as a collection in the cache as discussed further below in connection with FIGS. 4-5. Cache 105 may be populated with decomposed collections of service objects as discussed in conjunction with FIGS. 4 and 5. FIG. 4 is a method for populating cache 105 with decomposed query results from service registry 106. FIG. 5 is a diagram of cache 105 used to illustrate populating cache 105 with both a collection of service objects as well as instances from the collection of service objects. FIG. 5 further illustrates storing keys in a table of cache 105 used to index those stored service objects.

FIG. 4—Method for Populating Cache with Decomposed Query Result

FIG. 4 is a method 400 for populating cache 105 (FIG. 1) with a decomposed query result from service registry 106 (FIG. 1) in accordance with an embodiment of the present invention.

Referring to FIG. 4, in conjunction with FIGS. 1 and 3, in step 401, node A 103 receives a generic query from client 101. A generic query is a query that does not specify a particular service application to service the request. For example, client 101 may issue a service request to obtain a list of financial service applications.

In step 402, node A 103 accesses service registry 106 to obtain a collection of service objects in response to the generic query. The collection of service objects includes service meta-data for instances of the service objects in the collection. For example, the collection of service objects may be a collection of service objects for financial services. The collection may include a collection of service objects corresponding to service objects 1, 2 and 3. For instance, service object 1 may correspond to financial service application 1. Service object 2 may correspond to financial service application 2. Service object 3 may correspond to financial service application 3.

In step 403, node A 103 decomposes the collection of service objects retrieved from service registry 106. Decomposing may refer to extracting the instances from the collection of service objects. For instance, referring to the example above, the instances (service objects 1, 2 and 3) of the collection of service objects classified for financial services is extracted from the collection.

In step 404, node A 103 stores the collection of service objects as well as stores the instances of service objects extracted from the collection of service objects in a table of cache 105. For example, referring to FIG. 5, FIG. 5 is a diagram of cache 105 used to illustrate populating cache 105 with both a collection of service objects as well as instances from the collection of service objects in accordance with an embodiment of the present invention. As illustrated in FIG. 5, cache 105 includes a table 501 that stores key-value pairs. For instance, referring to the above example, the collection of service objects classified as financial services as well as each instance of the collection is stored as values in table 501. Keys will be discussed further below.

Referring to FIG. 4, in conjunction with FIGS. 1, 3 and 5, in step 405, node A 103 stores appropriate keys in table 501 of cache 105 to index the stored collection of service objects and to index the stored instances extracted from the stored collection of service objects. Keys may include a unique name, an internal identification, a query string and a port type. For example, referring to FIG. 5, the stored collection of service objects may be indexed using the query string from client 101 used to access the collection of service objects from service registry 106. Further, each instance of the collection of service objects may be indexed using what is referred as a unique name. For example, service object 1 may be indexed using unique name 1. Service object 2 may be indexed using unique name 2 and so forth. A unique name may include a name, a namespace and a version.

Method 400 may include other and/or additional steps that, for clarity, are not depicted. Further, method 400 may be executed in a different order presented and that the order presented in the discussion of FIG. 4 is illustrative. Additionally, certain steps in method 400 may be executed in a substantially simultaneous manner or may be omitted.

Method 400, as discussed above, discusses one manner in populating cache 105, such as populating cache 105 with objects from service registry 106 when the object is queried for the first time by client 101. Method 400 may also be used to populate cache 105 by specifying a "preload" where the cache is populated with objects from service registry 106 prior to the object being queried by client 101. Upon populating cache 105 with objects from service registry 106, cache hits and misses for cache 105 may be handled as discussed below in association with FIG. 6.

FIG. 6—Method for Handling Cache Hits and Misses

FIG. 6 is a method 600 for handling cache hits and misses from cache 105 (FIG. 1) in accordance with an embodiment of the present invention.

Referring to FIG. 6, in conjunction with FIGS. 1, 3 and 5, in step 601, node A 103 receives a direct query from client 101 to access a particular instance of a web service application.

In step 602, node A 103 generates a key from client's 101 request. A key may be generated in many manners, including performing a hash on client's 101 request. Generating a key from a request is known in the art and will not be described in detail for the sake of brevity.

In step 603, node A 103 performs a table look-up in cache 105 using the generated key to determine if service meta-data is stored in a service object for the requested web service application. That is, node A 103 performs a table look-up in cache 105 to determine if there is a "cache hit," where a cache hit refers to having the generated key index cache 105 to obtain a value (i.e., a service object for the requested web service application).

In step 604, node A 103 determines whether cache 105 stores a service object for the requested web service application using the table look-up of step 603. That is, node A 103 determines whether there is a cache hit or a cache miss in cache 105. As stated above, a cache hit refers to having the generated key index cache 105 to obtain a value. A cache miss refers to having the generated key not being able to index cache 105 to obtain a value.

If cache 105 does store a service object for the requested web service application, then, in step 605, node A 103 accesses the service object for the requested web service application using the generated key. For example, referring to FIG. 5, if client's 101 request included a request to access a web service application that is associated with service object 1, and the key generated based on client's 101 request corresponded to unique name 1, then node A 103 is able to access service object 1 using the key of unique name 1.

Returning to FIG. 6, in conjunction with FIGS. 1, 3 and 5, upon accessing the service object for the requested web service application, node A 103, in step 606, invokes the requested web service application (i.e., endpoint 108) to provide the requested service for client 101 using the service meta-data in the obtained service object.

Referring to step 604, if cache 105 does not store a service object for the requested web service application, then, in step 607, node A 103 accesses service registry 106 for the service object containing service meta-data for the requested web service application. In step 608, node A 103 stores the obtained service object and the key generated in step 602 in table 501 of cache 105.

Method 600 may include other and/or additional steps that, for clarity, are not depicted. Further, method 600 may be executed in a different order presented and that the order presented in the discussion of FIG. 6 is illustrative. Additionally, certain steps in method 600 may be executed in a substantially simultaneous manner or may be omitted.

Once cache 105 is populated with objects from service registry 106, it is important to ensure data consistency between cache 105 and service registry 106. A method for maintaining synchronization between cache 105 and service registry 106 to ensure data consistency between cache 105 and service registry 106 is discussed below in connection with FIG. 7.

FIG. 7—Method for Maintaining Synchronization Between Cache and Service Registry FIG. 7 is a method 700 for maintaining synchronization between cache 105 (FIG. 1) and service registry 106 (FIG. 1) in accordance with an embodiment of the present invention.

Referring to FIG. 7, in conjunction with FIGS. 1, 3 and 5, in step 701, node B 107 updates the service objects, including service meta-data, in service registry 106.

In step 702, node A 103 receives a notification from node B 107 that identifies particular service objects in service registry 106, including service meta-data, that have been updated.

In step 703, node A 103 examines cache 105 to determine if any service objects identified in the notification are stored in cache 105. If there are no service objects identified in the notification that are stored in cache 105, then, in step 704, no update is needed for cache 105.

However, if there are service objects identified in the notification that are stored in cache 105, then, in step 705, node A 103 determines if any of the collections of service objects, that include the identified service objects, need to be updated. For example, suppose a collection of service objects is classified as financial services, which includes the instances of service object 1, service object 2 and service object 3. If service object 1 is updated, node A 103 determines whether the collection that includes service object 1 needs to be updated. If the collection that includes the instance of service object 1 is classified as financial services and the update to service object 1 does not change its classification (e.g., still classified as financial services), then the collection that includes the instance of service object 1 does not need to be updated. However, if the update to service object 1 does change its classification, then the collection that includes the instance of service object 1 needs to be updated.

Referring to step 705, if none of the collections of service objects that include the identified service objects need to be updated, then, in step 706, node A 103 discards the identified service objects from table 501 of cache 105. In step 707, node A 103 accesses service registry 106 for the updated service objects where the former instances of those service objects were discarded from cache 105. In step 708, node A 103 stores the retrieved updated service objects in table 501 of cache 105.

If, however, there are collections of service objects, that include the identified service objects, that need to be updated, then, in step 709, node A 103 discards the identified service objects and appropriate collection(s) of service objects from table 501 of cache 105. In step 710, node A 103 accesses service registry 106 for the updated service objects, including updated collection(s) of service objects, where the former versions of those service objects, including former versions of collection(s) of service objects, were discarded from cache 105. In step 711, node A 103 stores the retrieved updated service objects and updated collection(s) of service objects in table 501 of cache 105.

Method 700 may include other and/or additional steps that, for clarity, are not depicted. Further, method 700 may be executed in a different order presented and that the order presented in the discussion of FIG. 7 is illustrative. Additionally, certain steps in method 700 may be executed in a substantially simultaneous manner or may be omitted.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

What is claimed is:

1. A method for improving performance of an enterprise service bus comprising the steps of:
   receiving a query from a client;
   accessing a service registry to obtain a collection of service objects in response to said query;
   decomposing said collection of service objects into instances of said collection of service objects; and
   storing, by a processor, said collection of service objects as well as said instances of said collection of service objects in a cache.

2. The method as recited in claim 1 further comprising the step of:
   storing appropriate keys in said cache to index said collection of service objects as well as to index said instances of said collection of service objects in said cache.

3. The method as recited in claim 2, wherein said stored keys comprise one or more of the following: a unique name, an internal identification, a query string and a port type.

4. The method as recited in claim 1 further comprising the step of:
   receiving a direct query from said client to access a particular instance of a web service application.

5. The method as recited in claim 4 further comprising the steps of:
   generating a key from said direct query; and
   performing a table look-up in said cache using said generated key to determine if service meta-data is stored in a service object associated with said web service application.

6. The method as recited in claim 5 further comprising the steps of:
   accessing said service object associated with said web service application if said service object associated with said web service application is located in said cache; and
   invoking said web service application using service meta-data in said service object associated with said web service application.

7. The method as recited in claim 1 further comprising the steps of:
   receiving a notification that a service object in said service registry has been updated;
   discarding said service object in said cache;
   accessing said service registry for said updated service object; and
   storing said updated service object in said cache.

8. The method as recited in claim 7 further comprising the step of:
   discarding a collection of service objects in said cache, wherein said collection of service objects contains said service object that has been updated.

9. A system, comprising:
   a memory unit for storing a computer program for improving performance of an enterprise service bus; and
   a processor coupled to said memory unit, wherein said processor, responsive to said computer program, comprises:
   circuitry for receiving a query from a client;
   circuitry for accessing a service registry to obtain a collection of service objects in response to said query;
   circuitry for decomposing said collection of service objects into instances of said collection of service objects; and
   circuitry for storing said collection of service objects as well as said instances of said collection of service objects in a cache.

10. The system as recited in claim 9, wherein said processor further comprises:
    circuitry for storing appropriate keys in said cache to index said collection of service objects as well as to index said instances of said collection of service objects in said cache.

11. The system as recited in claim 10, wherein said stored keys comprise one or more of the following: a unique name, an internal identification, a query string and a port type.

12. The system as recited in claim 9, wherein said processor further comprises:
    circuitry for receiving a direct query from said client to access a particular instance of a web service application;
    circuitry for generating a key from said direct query; and
    circuitry for performing a table look-up in said cache using said generated key to determine if service meta-data is stored in a service object associated with said web service application.

13. The system as recited in claim 12, wherein said processor further comprises:

circuitry for accessing said service object associated with said web service application if said service object associated with said web service application is located in said cache; and circuitry for invoking said web service application using service meta-data in said service object associated with said web service application.

14. The system as recited in claim 9, wherein said processor further comprises:

circuitry for receiving a notification that a service object in said service registry has been updated;

circuitry for discarding said service object in said cache;

circuitry for accessing said service registry for said updated service object; and circuitry for storing said updated service object in said cache.

15. A computer program product embodied in a computer readable storage medium for improving performance of an enterprise service bus comprising the programming steps of:

receiving a query from a client;

accessing a service registry to obtain a collection of service objects in response to said query;

decomposing said collection of service objects into instances of said collection of service objects; and storing said collection of service objects as well as said instances of said collection of service objects in a cache.

16. The computer program product as recited in claim 15 further comprising the programming step of:

storing appropriate keys in said cache to index said collection of service objects as well as to index said instances of said collection of service objects in said cache.

17. The computer program product as recited in claim 16, wherein said stored keys comprise one or more of the following: a unique name, an internal identification, a query string and a port type.

18. The computer program product as recited in claim 15 further comprising the programming steps of:

receiving a direct query from said client to access a particular instance of a web service application;

generating a key from said direct query; and performing a table look-up in said cache using said generated key to determine if service meta-data is stored in a service object associated with said web service application.

19. The computer program product as recited in claim 18 further comprising the programming steps of:

accessing said service object associated with said web service application if said service object associated with said web service application is located in said cache; and invoking said web service application using service meta-data in said service object associated with said web service application.

20. The computer program product as recited in claim 15 further comprising the steps of:

receiving a notification that a service object in said service registry has been updated;

discarding said service object in said cache;

accessing said service registry for said updated service object; and storing said updated service object in said cache.

\* \* \* \* \*